March 30, 1965 L. J. MAYER 3,176,278

THERMAL METHOD AND SYSTEM OF MAGNETIC RECORDING

Filed April 22, 1958 5 Sheets-Sheet 1

INVENTOR.
LUDWIG J. MAYER

BY

Stuart R. Peterson

ATTORNEY

March 30, 1965 L. J. MAYER 3,176,278

THERMAL METHOD AND SYSTEM OF MAGNETIC RECORDING

Filed April 22, 1958 5 Sheets-Sheet 2

INVENTOR.
LUDWIG J. MAYER
BY
Stuart R. Peterson
ATTORNEY

THERMAL METHOD AND SYSTEM OF MAGNETIC RECORDING

Filed April 22, 1958 5 Sheets-Sheet 3

INVENTOR.
LUDWIG J. MAYER
BY
Stuart R. Peterson
ATTORNEY

INVENTOR.
LUDWIG J. MAYER
BY
Stuart R. Peterson
ATTORNEY

March 30, 1965 L. J. MAYER 3,176,278

THERMAL METHOD AND SYSTEM OF MAGNETIC RECORDING

Filed April 22, 1958 5 Sheets-Sheet 5

INVENTOR.
LUDWIG J. MAYER
BY
Stuart R. Peterson
ATTORNEY

United States Patent Office 3,176,278

Patented Mar. 30, 1965

3,176,278

THERMAL METHOD AND SYSTEM OF MAGNETIC RECORDING

Ludwig J. Mayer, St. Paul, Minn., assignor, by mesne assignments, to Litton Systems Inc., Beverly Hills, Calif., a corporation of Maryland Filed Apr. 22, 1958, Ser. No. 730,145
12 Claims. (Cl. 340—174.1)

This invention relates generally to magnetic recording, and pertains more particularly to a method and system of recording in which the recording is accomplished thermally.

One object of the invention is to reverse the direction of magnetization of a pre-magnetized medium, such as a magnetic plate or tape, in certain localized regions through the application of concentrated heat to such regions. In this way, the regions having the reversed polarity are indicative of the recorded information or intelligence and can be read out at any subsequent time inasmuch as the magnetization is of a permanent, though erasable, character.

Another object of the invention is to provide a method of recording that is extremely flexible and versatile in nature. In this regard, it is planned that magnetic dots, dashes or curved lines be utilized in recording the information. For instance, when using magnetic dots, the size of these dots, as well as the spacing and relative location thereof, may be varied in the recording of information. Since the invention involves the use of heat, the time that the pre-magnetized medium is subjected to the heat can be utilized to vary the size of the magnetic dots, even though the heat is applied in only a minute area, for the inherent thermal conductivity of the metallic film can be relied upon to spread or enlarge the dot. Similarly, it is possible to vary the heat intensity to achieve the same dot enlargement. Also, where the heat is being applied by electron bombardment or wave energy, such as infrared impingment, de-focusing of the beam can be resorted to in order to spread the heating effect over a greater area. Thus, it can be recognized that my invention is adaptable to various conditions and is susceptible to rather extreme miniaturization where circumstances so dictate.

Another object of the invention is to minimize the degree of heat that must be utilized in the actual recording procedure. Thus, various modulation techniques can be employed to vary the heat that is to represent the information to be recorded. In the achievement of this aim, it is within the purview of the invention to preheat the recording medium to a temperature somewhat below the Curie point temperature, the Curie temperature being that temperature at which the magnetic material becomes nonmagnetic. It is this critical temperature with which the present method is concerned, so where a preheating step is utilized the temperature of the film is elevated somewhat and thus brought near to the critical Curie point temperature, and the intensity of the writing-in heat need only be enough to cause incremental heating to a point above the critical temperature. It is recognized that the Curie point will vary widely for different materials, but the preheating step can be utilized to compensate for such a difference. As an illustration of how widely magnetic films can vary as to their Curie points, a MnBi film will have a Curie point of approximately 360° C., whereas a MnAs film would have a Curie point of only about 48° C. Thus, considerable preheating might be desirable for MnBi, the actual degree of preheating depending to a large extent upon the read-in instrument and its capabilities to elevate thermally in a rapid manner the target film region.

A further object of the invention is to provide a magnetic memory system in which the read-in and read-out can be accomplished in a completely electronic manner, i.e., by means of electron beams. Magnetic memory systems are, of course, known, but they are not electronic in the meaning defined above because they do not use electron beams for read-in and read-out. Electron beams have been employed in electrostatic memory systems, but in such a system the storage is not permanent. Thus an aim of the instant invention is to provide an electronic system in which the information may be retained on the medium, which is magnetic in character, for indefinite periods without deterioration.

Still another object of the invention is to provide a system in which the stored information may be readily erased whenever it is desired to do so.

Yet another object of the invention is to provide a system of the foregoing character in which the read-in and read-out can be accomplished with the same physical arrangement, parts of which are common for both the read-in and read-out, through the instrumentality of a "read-in"—"read-out" switching unit.

The invention will best be understood by referring to the following detailed specification wherein two embodiments thereof are described, taken in conjunction with the appended drawings, in which.

Figure 3A:
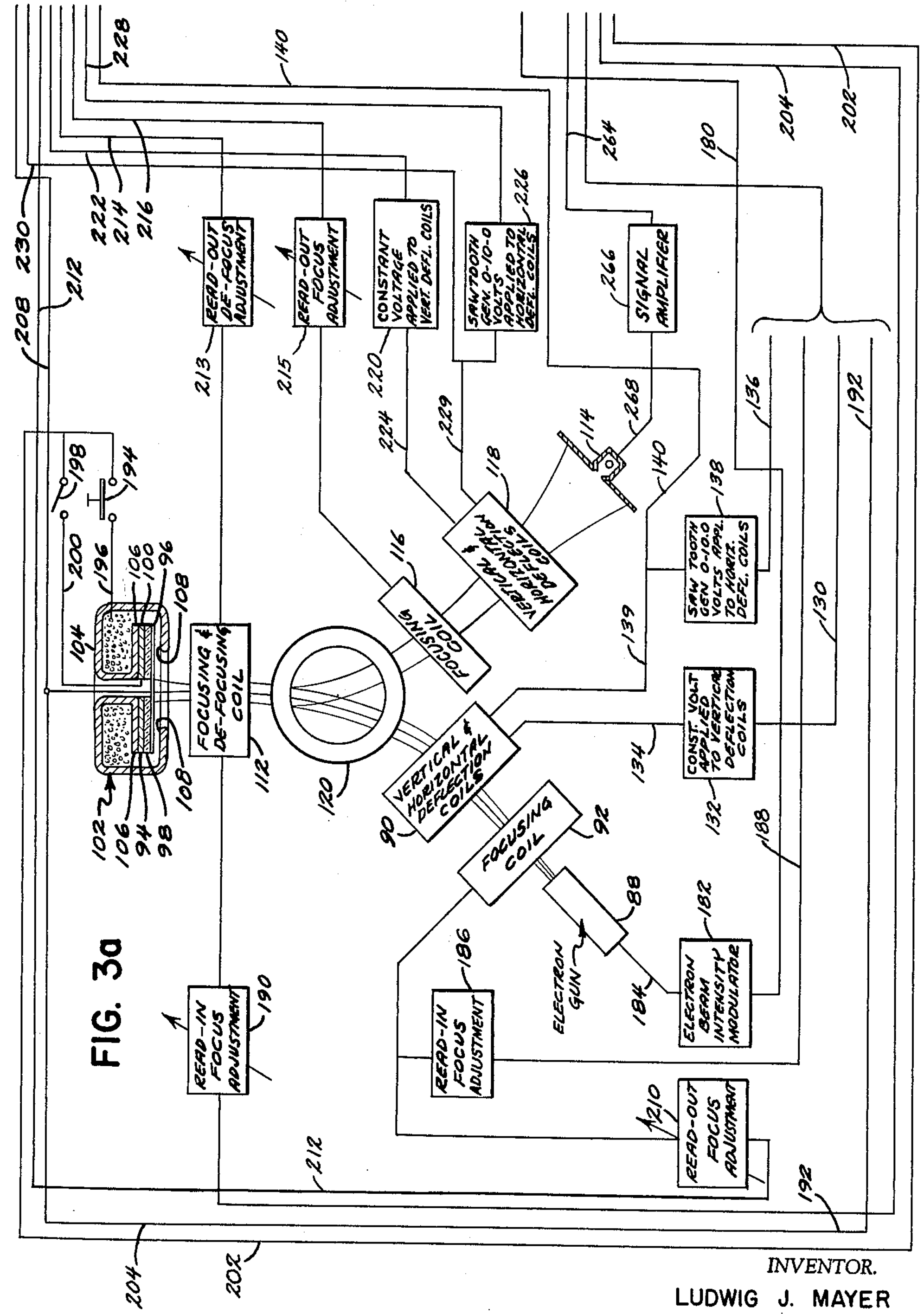
Figure 3B:
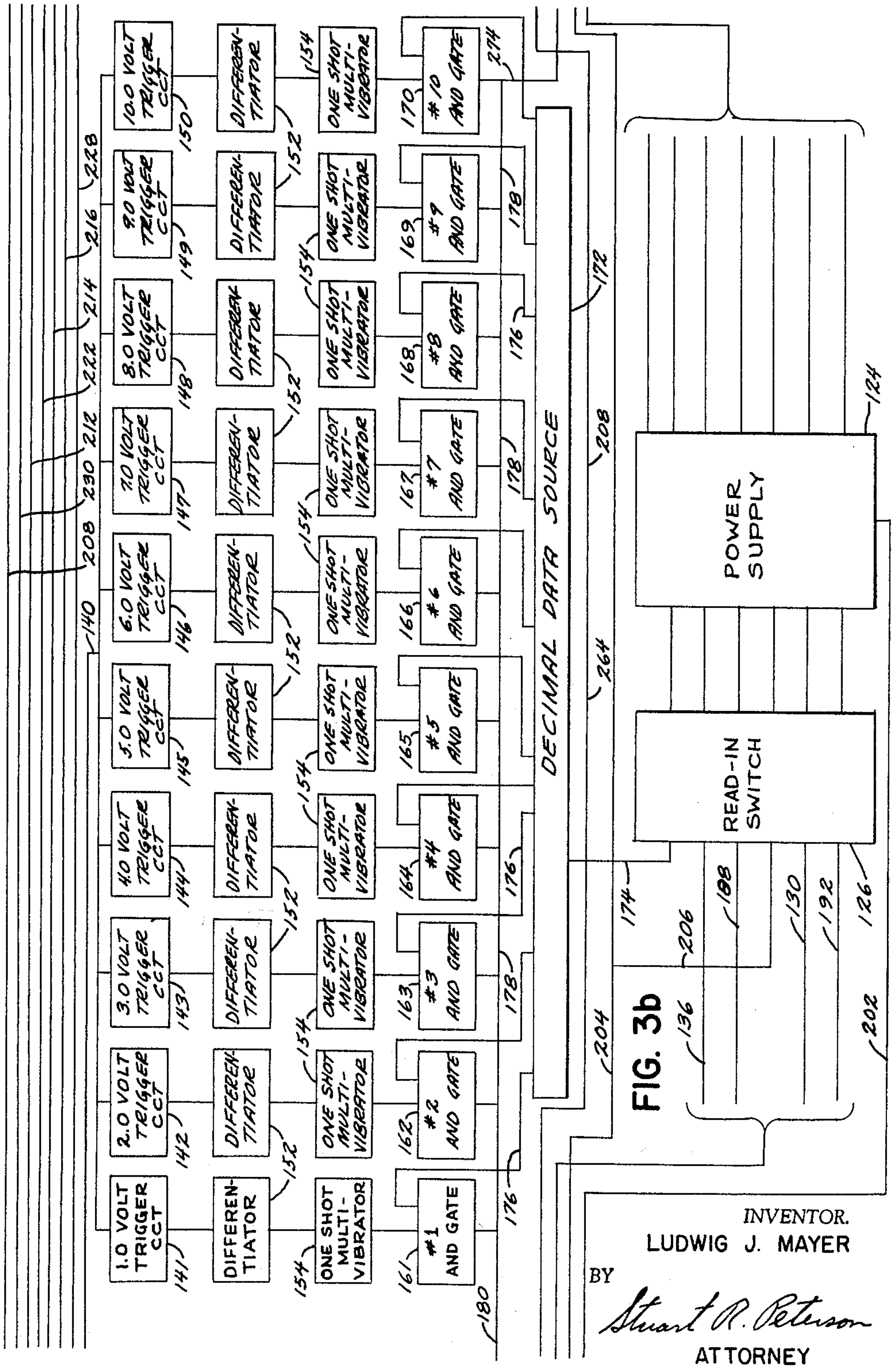
Figure 3C:
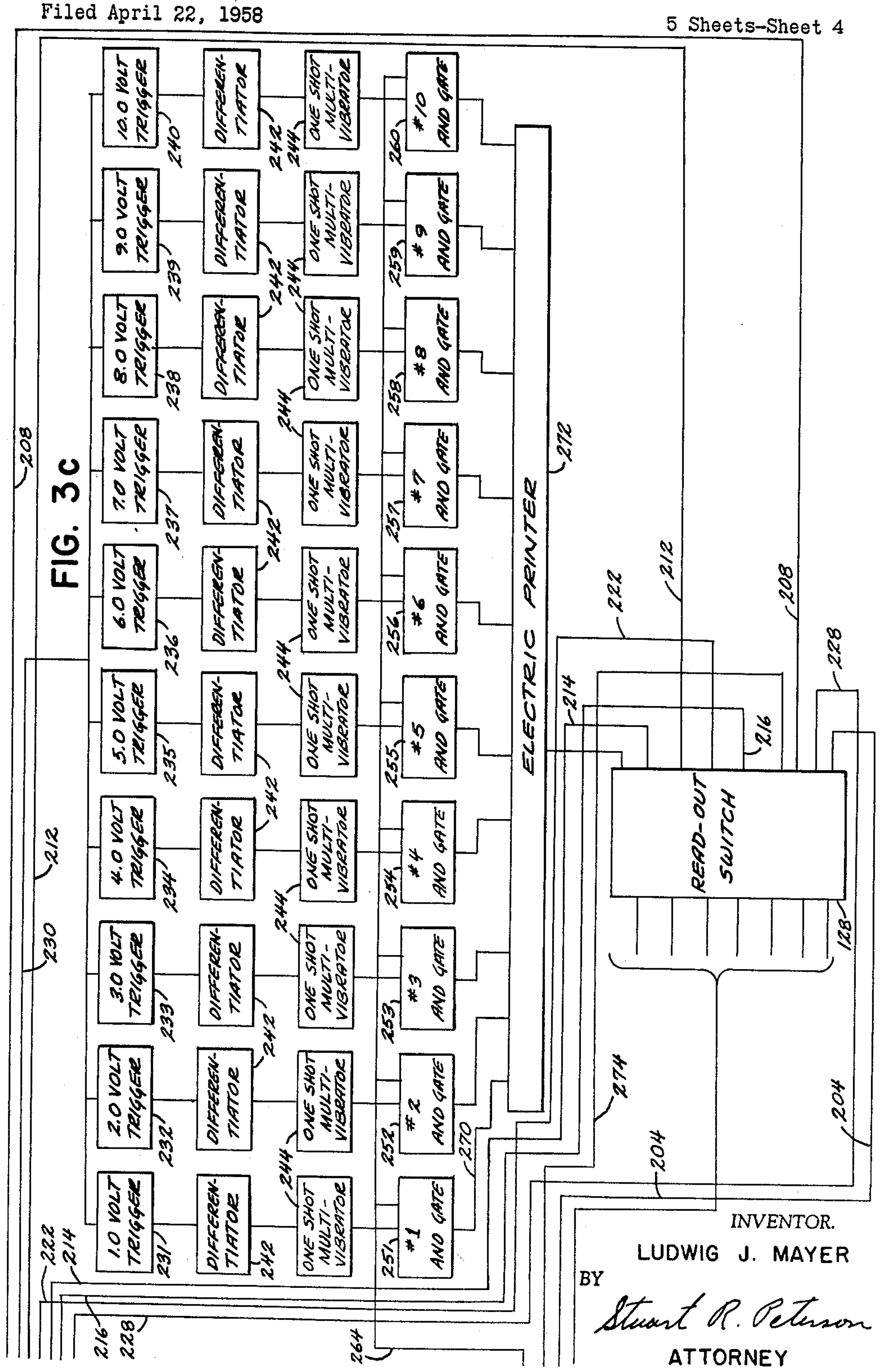
Figure 4:
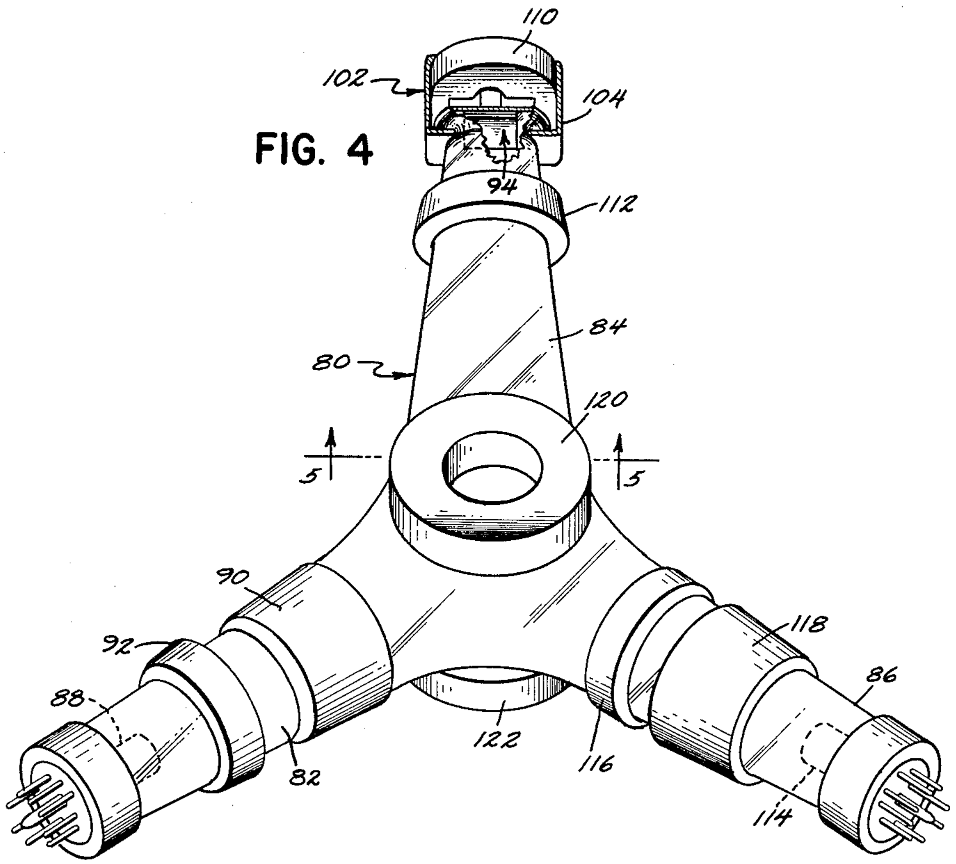
Figure 5:
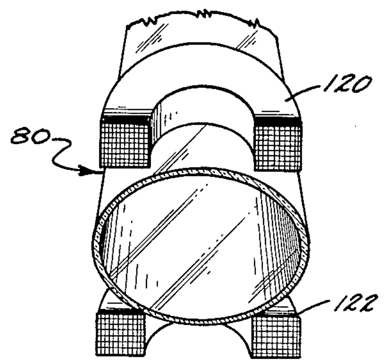

FIGS. 3*a*, 3*b*, and 3*c* when placed end to end depict an over-all data processing system embodying the invention in a completely electronic form;

FIG. 4 is a plan view showing the evacuated tube in which certain of the components set forth in FIG. 3*a* are disposed together with certain of the components that may lie exteriorly of the tube, and FIG. 5 is a sectional view taken in the direction of line 5—5 of FIG. 4.

Figures 1, 2:
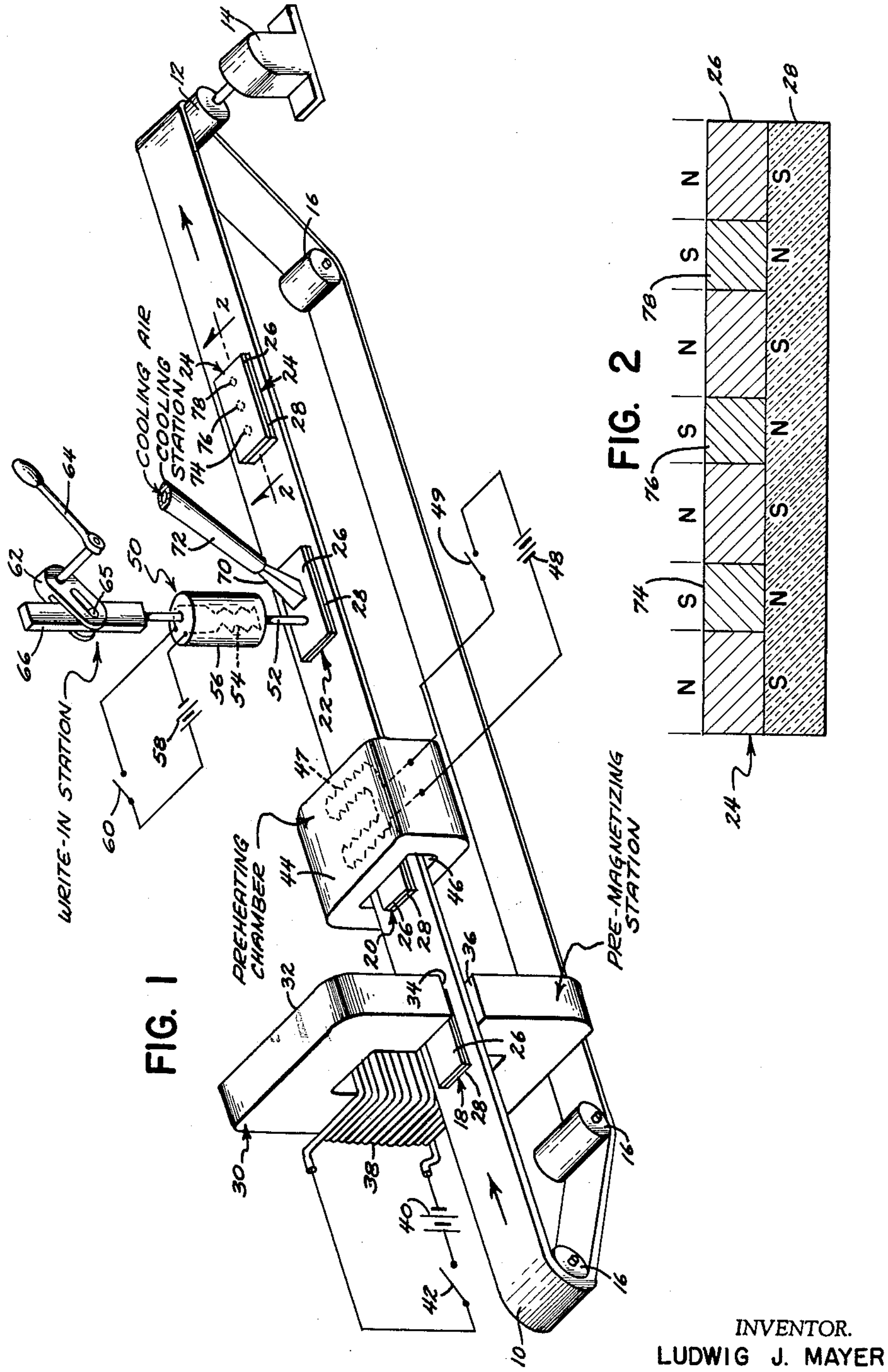
FIGURE 1 is a schematic view in perspective of certain illustrative apparatus that will facilitate an understanding of the basic concepts underlying the invention.
FIG. 2 is an enlarged sectional view taken in the direction of line 2—2 of FIG. 1, the view being for the purpose of visually describing the reversal of magnetization that occurs in the film after the Curie point heating and subsequent cooling have taken place.

Referring now in detail to FIG. 1 of the drawings, there is shown an embodiment which includes an endless conveyor belt 10 that may be of rather small dimensions. For the purpose of moving this belt there is a drive roller 12 which is rotated by means of a driving motor 14. The belt 10 is entrained about a plurality of idler rollers 16. Placed on the belt 10 at various intervals therealong are four record or storage units 18, 20, 22, and 24. Each storage unit has a magnetizable film 26, such as a thin coating of MnBi or MnAs, disposed on a glass substrate or base 28. While the substrate 28 has been referred to as constituting glass, it will be appreciated that quartz, ceramic materials and the like, including plastics if capable of withstanding sufficiently elevated temperatures, might be employed. Actually, since the Curie point will vary so widely for different films 26, the temperature to be withstood will likewise vary, and the substrate will, of course, be selected with this fact in mind.

While the precise thickness of the film 26 will depend upon a number of factors, it can be generally stated that the film should be as thin as possible so that the heat to be introduced can quickly penetrate the full depth. In this regard, it is envisaged that metallic evaporation techniques might well be utilized in applying the film 26 to the glass substrate 28. One technique that has been found satisfactory is set forth in the article entitled "Magnetic Writing on Thin Flms of MnBi," by H. J. Williams et al., appearing on pages 1181–1184 of the October 1957 issue of the Journal of Applied Physics.

In order to magnetize initially the film 26 on each of the units 18, 20, 22, and 24 in a direction normal to their respective surfaces each record or unit is moved past a premagnetizing station consisting of an electromagnet 30 provided with a core 32 having opposed pole faces 34, 36 and a winding or coil 38. The storage unit 18 is depicted at this premagnetizing station. The energization for the coil 38 is furnished by a D.C. source of electric power, such as a battery 40, having in circuit therewith a disconnect switch 42. When the switch 42 is closed, the electromagnet 30 sets up a field in a direction to impart, say, a positive or north pole polarity to the film 26. In other words, when the unit 18 leaves the electromagnet 30, the film 26 thereon will have been uniformly driven to saturation in a single direction that is normal to the general plane of the film.

In some instances it may be desirable to preheat the film although certainly not necessarily in every situation. With this thought in mind, a pre-heating chamber 44 is pictured in FIG. 1, the chamber 44 having a passage at 46 through which the belt 10 passes together with any storage unit that might be moving along with the belt. As shown, the unit 20 is entering the passage 46. Contained within the chamber 44 are electric heating elements 47 designed to elevate the temperature of the moving film 26 to a temperature somewhat below the Curie point of the material constituting said film. In actual practice, a thermostatic control of the heating elements 47 would be employed, but in the exemplified instance only a battery supply 48 having a switch 49 in circuit therewith is depicted.

Coming now to the most crucial stage of the invention, which is the heating of the film 26 in localized areas or regions representative of the information to be stored, there is depicted a read-in device denoted generally by the numeral 50. While this device may assume a variety of forms, it has been pictured as including a write-in needle or pen 52 heated electrically by a heating element 54 enclosed in a suitable housing 56. Energization for the element 54 is from a battery source 58 having in circuit therewith a switch 60. The entire housing 56 and its projecting pen 52 are constrained for reciprocal travel in a vertical direction. The means for guiding the housing and pen is not shown for it is immaterial to a practicing of the invention. Actually the pen 52 might be moved horizontally, if desired, for only a relative movement is necessary between the pen and the storage unit in order to record information.

In the illustrative case, however, the drawing shows a slotted lever 62 which is pivotally actuated by a handle 64. By reason of a pin 65 carried by a cross head 66, it can be discerned that the desired reciprocal travel of the pen 52 is realized. It might be explained that actual contact of the pen 52 with the film 26 on the storage unit 22 is not essential for with a preheating of a MnBi film to a temperature of about 260° C., a tiny platinum wire provided with a flattened tip having a width of about 0.06 mm. functioned very well when heated to about 780° C., a spacing of roughly 0.1 mm. from the film being maintained.

Immediately after leaving the write-in station the storage unit 22 is cooled. In order to actually illustrate a cooling step, a nozzle 70 is pictured having attached thereto a supply tube 72 leading to a source of cooling air. While in many situations the ambient temperature will be entirely adequate as far as providing the necessary cooling action, nonetheless the specific cooling station described in this paragraph is pictured for purposes of clarity and emphasis. It will be appreciated that the rapid quenching of the heated regions is desirable in order to preclude unwanted heat dissipation throughout the adjacent areas of the film. Actually by utilizing a very thin film 26 (of the order of about 1,000 A.) and by introducing only enough heat to heat the localized area or region that is to undergo a reversal of magnetization, the problem of heat conduction through greater sections of the film is avoided.

A number of different codes can be utilized in the recording of information or intelligence on the various storage units 18, 20, 22 and 24. To render the discussion as simple as possible we will assume that only three "dots" are formed in the exemplified case. Accordingly the three "dots" or regions that have been heated to a temperature above the Curie point of the film 26 have been indicated by the reference numerals 74, 76 and 78 on the record or storage unit labelled 24. It can be pointed out at this time that the reversal of magnetization of the regions 74, 76 and 78 is made possible by the pre-magnetization that was previously alluded to.

To clarify what has occurred during the cooling of the regions 74, 76 and 78, attention is drawn to the greatly enlarged sectional view set forth in FIG. 2. From this view it can be appreciated that the regions 74, 76 and 78 are virtual islands each having its own north and south pole, whereas the remaining film material 26 surrounding these island-like regions has retained its original polarity. Due to the initial state of polarity induced in the film 26 by the electromagnet 30 the upper surfaces of the regions 74, 76, and 78 will all now be of a south pole character and their lower surfaces of a north pole character, having undergone a magnetic reversal from the original state. The original state having imparted to the film 26 a north pole polarity, this north pole polarity is still retained by all of the film material not having had its temperature raised above the Curie point.

From the foregoing, the preferred steps involved in practicing of my method are as follows:

(1) Premagnetize the film 26;
(2) Pre-heat, if necessary, the film;
(3) Write in information by heating certain regions to a temperature above the Curie point for the material selected for the film;
(4) Cool the regions representing the information to be stored to effect a magnetic reversal of these regions.

The foregoing embodiment has illustrated one way in which the invention may be practiced. However, it is felt that the invention will have its greatest utility when embodied in an all electronic system comprising both read-in and read-out features. Accordingly attention is now directed to FIGS. 3*a*, 3*b*, 3*c*, 4 and 5. It should be understood at the outset, though, that the block diagram circuitry is only illustrative and that considerable modification thereof would undoubtedly be made in actual practice. However, the specific blocks that have been presented do aid in an understanding of the more basic invention.

In FIG. 4 it can be discerned that there is employed an evacuated tube 80 comprised of a first tubular leg portion 82, a second tubular leg portion 84, and a third tubular leg portion 86, all tapering somewhat toward their distal ends. At one end of the leg portion 82 is disposed an electron gun 88 which is of conventional construction.

Also associated with the leg portion 82 is a read-in deflection means labelled 90, this deflection means including both horizontal and vertical deflection coils. Intermediate the electron gun and the deflection means 90 is a focusing coil 92 also of well known construction.

At the far end of the leg portion 84 a record or a storage unit 94 is situated. Reference has already been made to the record or storage units 18, 20, 22 and 24 and it may be pointed out at this time that the instant record or storage unit 94 may be of identical construction. Therefore the unit 94 includes a magnetizable film 96 on a glass substrate 98 (best shown in FIG. 3*a*). One point of difference that may be incorporated into the present situation, though, is the fact that the reverse side of the glass substrate may be provided with a resistive coating 100 (also best viewed in FIG. 3*a*) so a preheating of the magnetizable film 96 may be achieved even though the unit 94 is disposed within the evacuated tube 80.

An electromagnet designated generally by the reference numeral 102 is also located at this same end of the second leg portion 84. The magnet corresponds in function to the previously alluded to electromagnet 30. The electromagnet 102 comprises a core 104 having pole faces 106, 108. The core 104 has magnetically associated therewith a coil or winding 110. More will be said hereinafter concerning the precise manner in which the premagnetization is realized.

Between the end of the tubular leg portion 84 where the record or storage unit 94 is positioned and the intersection of the leg portions 82, 84, and 86 is a focusing and defocusing coil or lens 112. Actually, the respective focusing and defocusing functions are achieved by varying the energization of this coil 112 but the reason for such a change in the energization is best left for discussion at a somewhat later time.

The third tubular leg portion 86 is equipped with a detector 114 at the far end thereof. This detector may be a Faraday cage collector or electron multiplier. A focusing coil 116 is associated with the leg portion 86. Also associated with this same leg portion is a read-out deflection means 118 comprised of both horizontal and vertical deflection coils.

While the respective deflection means 90 and 118 are employed in a rather conventional fashion, there are additionally utilized a pair of deflection coils 120, 122 at the intersection of the leg portions 82, 84 and 86. These coils can also be of conventional construction but differ appreciably in the manner in which they are energized and in their orientation from the deflection coils included in the means 90 and 118. More specifically, the deflection coils 120 and 122 may be of the Helmholtz variety and one is fixedly mounted above the intersection of said legs and the other directly below in a manner best viewed in FIG. 5.

One nicety about the invention is that the coils 90, 92, 112, 116, 118, 120, 122 and the electromagnet 102 can all be located exteriorly of the tube 80. Thus, should any component housed within the tube 80 fail or deteriorate sufficiently, such as loss of emissivity of the electron gun 88, then the external components may be removed and saved for use with a new tube 80.

Passing now to the means for furnishing power during the operation of the foregoing components, attention is called to the use of a multiple power supply 124. Although the voltages and polarities may very well be appreciably different from each other, nonetheless for purposes of simplification a single rectangular box has been illustrated in FIG. 3*b* as constituting this power supply. It is felt that persons familiar with the operation of cathode ray tubes will be sufficiently capable of selecting the appropriate voltage values. Immediately adjacent the power supply 124 is located a read-in switch unit 126 and on FIG. 3*c* a read-out switch unit 128 is employed. These switch units may be mechanically and/or electronically interlocked in practice if desired.

From the read-in switch unit 126 a conductor 130 extends to a constant voltage supply circuit 132 for the vertical deflection coils of the read-in deflection means 90, a conductor 134 leading from said supply 132 directly to the vertical deflection coils of said means 90. It might be explained that the ensuing description is somewhat simplified by assuming that only a constant voltage is applied to the vertical deflection coils. In actual use of my electronic system a saw tooth voltage would be applied to these vertical deflection coils.

A conductor 136 extends from the read-in switch 126 to a saw tooth generator 138 which is capable of applying a saw tooth voltage to the horizontal deflection coils of the deflection means 90. Solely for the purpose of facilitating an explanation of what transpires, we will assume that the saw tooth generator is capable of applying from zero to ten volts to the horizontal deflection coils of said means 90. However the specific voltage values may well vary considerably from those selected as convenient values for illustrating the invention.

In addition to applying a saw tooth signal to the horizontal deflection coils of the means 90 the saw tooth generator supplies a signal via a conductor 140 to a plurality of trigger circuits 141–150. The trigger circuit 141 has been assigned a tripping value of 1.0 volt, the trigger circuit 142 a tripping value of 2.0 volts, the circuit 143 a value of 3.0 volts, the circuit 144 a value of 4.0 volts and so on up to a 10.0 volt value for the trigger circuit 150. Hence it is believed somewhat more apparent that the arbitrary 10 volt sweep value that has been given to the saw tooth generator permits the application of one volt increments to the various trigger circuits 141–150. Basically the trigger circuits may comprise only a triode vacuum tube each having its control grid biased so that the tube is rendered conductive when the assigned tripping voltage is reached. During the remainder of the saw tooth sweep the tube will remain in its conductive state, but will return to its non-conductive state when the saw tooth wave drops back to zero.

Connected to the output or plate circuit of the various trigger circuits 141–150 is a differentiator 152, there being a differentiator for each of the trigger circuits. By reason of the differentiators 152 it will be recognized that only a relatively sharp spike is generated whenever the trigger circuit with which that particular differentiator is associated is actuated.

The output spike from each differentiator 152 when it occurs is impressed upon a one shot multivibrator 154. The various multivibrators 154 generate a rectangular output pulse of a predetermined time duration which time duration is sufficiently short so that the pulse will fall to zero magnitude before the next or succeeding trigger circuit is tripped. For instance, the trigger circuit 141 will be tripped when a 1.0 volt point is reached on the saw tooth wave and this will result in a rectangular output pulse from the one shot multivibrator 154 associated with this trigger circuit 141. The output rectangular pulse, though, will completely decay to zero before the 2.0 volt trigger circuit 142 is tripped. Once again it may be stated that the foregoing happening will be made clearer as the description progresses. As already explained the depicted circuitry is only intended to be illustrative. In this regard, for example, the various trigger circuits 141–150, differentiators 152 and multivibrators 154 could be a series of blocking oscillators, each triggered for the 1.0 volt increments that have been more or less arbitrarily selected.

The output pulses from the various multivibrators 154 are impressed upon one input of a plurality of 2-input AND gates 161–170. The No. 1 AND gate has been denoted by the reference numeral 161 and it is in circuit with the 1.0 volt trigger circuit 141. The No. 2 AND gate 162 is in circuit with the 2.0 volt trigger circuit 142 and so on with the No. 10 AND gate 170 being in circuit with the 10.0 volt trigger circuit 150.

For reasons of simplification it will be assumed that we will operate on the decimal system although in actual use a binary system would be preferable. With this in mind a decimal data source 172 is pictured in FIG. 3*b* and it can be placed in operation initially by a conductor 174 leading thereto from the read-in switch unit 126. A total of 10 conductors 176 connect the data source 172 to the second input of the 2-input AND gates 161–170. Thus if the decimal data source provides a signal via the conductor 176 leading to the No. 1 AND gate 161 an input will be provided for the second input of this particular AND gate. Therefore when there is a coincidence of input signals on the 2 inputs of this particular AND gate 161 then there will be an output impressed upon a bus 178 which is common to all of the AND gate outputs.

Connected to the bus 178 is a conductor 180 leading to an electron beam intensity modulator 182, and from the modulator 182 a conductor 184 connects to the control grid of the electron gun 88. Actually the modulator 182 in the present instance is responsible solely for applying the proper bias to the control grid so that the control grid permits the electron gun 88 to fire or generate its electron beam. In other words the gun 88 is "unblanked" at prescribed times.

Next to be described is a read-in focus adjustment 186 for the focusing coil 92. This adjustment circuit 186 is connected to the lead-in switch 126 via a conductor 188. Normally the adjustment 186 will be set so as to produce a very fine or pencil-like electron beam, all for a purpose subsequently to be described in greater detail.

A read-in focus adjustment 190 is provided for the focusing coil 112, it receiving its energization by way of a conductor 192 extending from the read-in switch 126. This read-in adjustment 190 accentuates the focusing action derived from the adjustment 186, it in essence providing a very concentrated electron beam for the time said beam impinges upon the film 96.

It will be remembered from the earlier described embodiment that an electromagnet 30 was utilized in premagnetizing the various recording units 18, 20, 22 and 24. In the present embodiment it has been pointed out that the electromagnet 102 provides this particular function. Accordingly in order to energize the electromagnet 102 a premagnetized (and erase) switch 194 is used, it being connected directly to the coil 110 by conductor 196. Although perhaps not completely clear at this particular time, it will also be mentioned that the switch 194 is responsible for providing an erasure of any previously recorded information that has been put onto the film 96. There is also a preheating switch 198 connected directly to the resistive coating 100 located on the back side of the glass substrate 98, a conductor 200 leading between this switch and the said resistive coating. Both of these switches 194 and 198 are furnished with power from the power supply 124 via a conductor 202.

Through the medium of a potential applying conductor 204 and a conductor 208, a positive potential is applied directly to the film 96. This positive potential is necessary during a read-in operation.

Up to this point sufficient information has been given so that a read-in operation can be described. Although certain components relating exclusively to a read-out operation also have been given, it is felt desirable to give a somewhat typical read-in operation before proceeding with the description pertaining to a read-out. Accordingly, the first step to be taken is to close the switch 194 in order to premagnetize the film 96. The premagnetization which takes place corresponds precisely to that which was done in the earlier described embodiment at the magnetizing station indicated generally by the reference numeral 30. Having premagnetized the film 96 by temporarily closing the switch 194 the next step to be accomplished is the closing of the preheating switch 198 if preheating is desired. This switch 198 will be left in its closed condition throughout the reading-in period, assuming of course that preheating is desired or preferred.

The succeeding step is to close the read-in switch unit 126. By reason of the conductor 204 and its associated conductor 206 leading to the read-in switch 126 a positive bias or potential is applied to the film 96. The positive bias so impressed upon the film 96 will be responsible for the attraction of the electron beam to said film.

With the read-in switch 126 closed it will be observed that the focusing coil 92 and the combined focusing and defocusing coil 112 are both energized. It will be assumed that the read-in focus adjustment 186 is such as to cause an appreciable narrowing of the electron beam generated by the electron gun at the point where the focsuing coil 92 is located. The read-in focus adjustment 190 will, of course, have to be adjusted and we will assume that such adjustment has taken place so that the coil 112 further accentuates the narrowing or constricting of the electron beam so that by the time it impinges upon the film 96 only a very minute spot will be struck by the electron beam.

Inasmuch as the purpose of the read-in operation is to record certain information we will assume that the decimal data source 172 has been programmed so that the desired information can be recorded. In this regard we will presume for the purpose of discussion that information might be recorded at $\frac{1}{10}$ increments on the film 96. If the number "5" is intended to be recorded then the data source 172 will be actuated or energized so that it places a signal on the second input to the No. 5 AND gate 165 via the particular conductor 176 leading to this specific AND gate.

Inasmuch as we have selected a constant voltage for application to the vertical deflection coils of the read-in deflection means 90 we will have only a horizontal sweep. Consequently when the saw tooth generator 138 produces a saw tooth wave that reaches 5.0 volts, the first input of the No. 5 AND gate 165 will also be energized since the 5.0 volts will trigger or trip the trigger circuit 145. In this way the simultaneous application of two input signals to the No. 5 AND gate 165 will result in an output signal from this gate which travels via the common bus 178 and the conductor 180 to the electron intensity beam modulator 182. All that the modulator 182 does is to modify the bias on the control grid of the electron gun 88 so that the previously blanked beam is unblanked and the electron beam for writing in the information is generated.

The writing-in beam so generated passes through the focusing coil 92 and is deflected by the horizontal deflection coils 90 to a predetermined extent governed by the particular 5.0 volt point then reached by the signal from the saw toothed generator 138. The beam so generated passes between the Helmholtz deflection coils 120, 122 and then through the focusing coil 112. After traversing the focusing coil 112, it impinges upon the film 96 at a locus indicative of the information to be recorded. In this situation the electron beam will impinge upon the film 96 at substantially the center or middle thereof ($\frac{5}{10}$ of the film's effective width). Such a happening heats a very small portion of the film 96 that is struck by the electron beam to a point above the Curie point of the film material. Of course the intensity of the electron beam, even though only impinging upon the film 96 for a very short interval, will nonetheless be made of sufficient magnitude so as to heat the encountered film portion to an extent that the portion so heated will reach a temperature above the Curie point. Inherent cooling of this portion after the beam has passed on, or more precisely has been turned off, will be instrumental in reversing the magnetization of the portion so impinged upon in a manner identical to the way the portions 74, 76 and 78 were reversed in the first described embodiment.

At this time it might again be emphasized that the description has been made overly simple by reason of the fact that we are not utilizing a vertical sweep of the electron beam. In actual practice a vertical sweep would, of course, be desired and instead of 2-input AND gates 161–170, as we are here dealing with, then 3-input gates would be employed in their stead.

Even with the simplified version now being described it will, of course, be appreciated that other portions of the film in a horizontal direction could be utilized for the recording of information. For instance, it might well be that the No. 1 AND gate might have its two inputs energized simultaneously so as to heat a portion of the film earlier in the sweep of the electron beam. In other words, at 1/10 of the effective width of the film 96 the portion there situated would be heated beyond its Curie point so as to record information at this No. 1 location. By the same token any of the other AND gates 161–170 might have their inputs energized simultaneously so as to emit an output signal. Once again, though, in the illustrative situation it has been decided to employ only the No. 5 AND gate and in this way only a No. 5 position on the film 96 will be heated beyond its Curie point.

Considering now the components directly related to a read-out operation, attention is drawn to the presence of a conductor 208 leading from a negative take-off on the power supply 124 via the read-out switch 128. More will be said during the subsequent operation pertaining specifically to read-out information and the need for this negative potential that must be applied to the film 96 during such a read-out.

Mention has already been made of the focusing coil 92. In reading out information, though, the precise focusing required during a read-in is not desired and therefore a separate read-out focusing adjustment 210 is incorporated into the system. This adjustment is identical with the adjustment 186 which permits the application to the focusing coil of a somewhat different voltage so that the degree of focusing previously achieved is not realized during a read-out. A conductor 212 extends from the read-out switch 128 to the focusing adjustment 210.

It has already been stated that the coil 112 performs a focusing and defocusing function. The defocusing function is needed during a read-out operation and with this in mind a read-out defocusing adjustment 213 is provided which receives its energization by a conductor 214 extending from the read-out switch 128. By changing the defocusing adjustment 213 sufficiently from the focusing adjustment 190 it will be appreciated that the electron beam can be literally spread out so that it in effect covers the general surface area of the film 96.

A read-out focusing adjustment 215 is provided for the focusing coil 116, it being energized by way of a conductor 216 leading from the read-out switch 128.

Having elected to apply a constant potential to the vertical deflection coil of the deflection means 90 during a read-in procedure, there exists no need for a saw tooth energization to be applied to the vertical deflection coils of the deflection means 118. Accordingly a constant voltage supply circuit 220 is employed and is energized via a conductor 222 from the read-out switch 128, a conductor 224 leading on to the vertical deflection coils of the means 118.

As with the earlier described saw tooth generator 138 the present generator 226 is capable of producing a saw tooth wave varying from zero to 10.0 volts. A conductor 230 connects the output from the saw tooth generator 226 to ten trigger circuits 231–240. The triggering circuit 231, for instance, is set to be triggered when the saw tooth wave reaches a voltage magnitude of 1.0 voltage, the triggering circuit 232 being set for 2.0 volts and so on up through the triggering circuit 240 which is adjusted so that it is tripped or triggered for 10.0 volts. Thus it can be discerned that the triggering circuits 231–240 are like the previously referred to triggering circuits 141–150. Also in this similar vein is the fact that each triggering circuit 231–240 has its output side connected to a differentiator 242 for the purpose of producing a voltage spike that is delivered to the input side of a plurality of one shot multivibrators 244. As in the read-in circuitry, blocking oscillators could readily be substituted here for the trigger circuits 231–240, the differentiators 242 and the multivibrators 244.

Just as in the case of the multivibrators 154, these multivibrators 244 put out a rectangular pulse which is impressed upon one input of a group of ten 2-input AND gates 251–260. The other input of each of these AND gates 251–260 is connected to a common second input bus 262. A conductor 264 leading to the bus 262 extends from the output side of a signal amplifier 266 which receives a signal from the detector 114 by way of a conductor 268. Through the means of a plurality of conductors 270, the various outputs of the AND gates 251–260 are impressed upon an electric printer 272.

During a read-out procedure it will of course be necessary to have the electron gun 88 generate an electron beam constantly. Consequently the electron beam intensity modulator 182 is adjusted so that it does not cause a blanking out of this beam. One way in which this can be simply achieved is through the medium of a conductor 274 connecting the read-out switch 128 to the common bus 178. Since the bus 178 is connected directly to the modulator 182 by way of a conductor 180, it follows that the power supply 124 can impress the appropriate signal onto the modulator 182 which in turn is relayed to the control grid of the electron gun 88 such that the electron beam is not interrupted during a read-out operation.

Having recorded the information as hereinbefore described, the read-out portion of the operation will now be readily understood. In this regard it can be stated that the read-in switch 126 is no longer closed and in lieu thereof the read-out switch 128 is closed so that a somewhat negative potential is applied to the film 96 via the conductor 208. With the read-out focusing adjustment 210 adjusted so that the focusing action of the coil 92 is somewhat lessened, it will be appreciated that the beam as it passes between the Helmholtz coils 120–122 will be somewhat dispersed. By the time that the beam reaches the coil 112, owing to the defocusing adjustment achieved by the circuit 213, the beam will be completely defocused so that it is spread over substantially the whole area of the film 96.

Inasmuch as the film 96 has now applied to it a somewhat negative bias, it can be appreciated that the spread-out or defocused beam does not actually strike the film for the electrons are repelled due to the negative polarity of said film. Stated somewhat differently, the magnetic film 96 now constitutes as far as its electron optics is concerned an electron mirror, for the electrons only approach the magnetic film very closely but do not impinge thereagainst. After reversing their direction and traversing the coil 112 once again, the electrons pass through the magnetic field provided by the deflection coils 120–122 which deflect the now information-carrying beam onto the focusing coil 116 which acts as a projection lens. It is after the passing through the focusing coil 116 that the electrons then encounter the deflection means 118 whereby the read-out scanning is accomplished.

It will be remembered that the No. 5 AND gate 165 was instrumental in recording information at what might be considered the No. 5 position of the film 96. Consequently in reading out this information, a signal will be produced at the detector 114 when the saw tooth voltage generated by the generator 226 reaches 5.0 volts. Thus it is the coincidence of a signal derived from the 5.0 voltage point and a signal developed by the detector 114 that is responsible for energizing concurrently both of the inputs of the No. 5 AND gate 255 in the read-out circuitry. Coincidence of these signals will cause the AND gate 255 to emit a signal to the electric printer 272. In this way the printer 272 will print whatever information is represented by the No. 5 AND gate 255 which as herein explained produces an output signal only when there is coincidence between the 5.0 volt value impressed upon the horizontal deflection coils of the deflection means 118 and the signal derived from the detector 114.

It is important to note that the action of the deflection coils 120–122 is such that the incoming beam, that is the beam heading toward the film 96 during a read-out operation, is separated from the outgoing beam, that is the reflected beam carrying the information that has been previously recorded onto the film 96.

By way of summation, it may be explained that the read-out operation involves electron microscopy techniques. The specific components entering into the performance of the electron microscopy role are the information-containing film 96, which when negatively biased serves as an electron mirror, the focusing coil 116 and the detector 114, which might be an observation screen if no deflection means 118 is employed. However, for complete data processing the deflection means 118, together with the detector 114, are greatly preferred over a simple fluorescent screen or photographic plate inasmuch as the depicted arrangement permits the direct handling of the read-out information. It might also be mentioned that the coils 112 and 116 can readily be used to play an image magnification role. Still further, the invention might be used to store entire pictorial images on the film 96, such images constituting information within the purview of the invention.

The invention has been described in connection with two specific embodiments, but it will be obvious to those skilled in the art that it may be readily carried out with other embodiments including different materials than have been suggested as constituting the magnetic films and may include additional refinements as desired for particular applications. The invention is therefore not intended to be limited by the above examples, except insofar as may be required by the scope of the appended claims.

What is claimed is:

1. A method of recording information on a magnetizable film comprising the steps of initially magnetizing said film to saturation in a direction normal to the general plane thereof, applying a positive potential to said film, directing a concentrated beam of electrons at certain portions of the film in order to heat said portions above the Curie point of the film material, said portions being representative of information to be stored, reversing the polarity of the potential applied to said film, directing a diffused beam of electrons toward said film, and obtaining an electron image of the diffused beam of electrons after reflection from said film which reflection is indicative of the orientation of said portions.

2. The method set forth in claim 1 including the step of sweeping the diffused beam of electrons through a preferred angle to obtain a reflected beam, and detecting at a fixed locus the difference in electron concentration in said reflected beam as influenced by the existence of said information-containing portions.

3. An electronic memory system comprising a premagnetized film in which the direction of magnetization is normal to the general plane of the film, an electron gun for producing a beam of electrons, means for causing said beam to impinge against certain portions of said film in accordance with information to be stored with sufficient intensity to cause said portions to be heated above the Curie point of the film, and means including said film for reading out the information stored in said film by reason of the reversed magnetization of said portions after said portions have cooled below said Curie point.

4. An electronic memory system comprising an evacuated tube including first, second and third angularly directed leg portions, an electron gun disposed within the projecting end of said first leg portion, read-in deflection means associated with said first leg portion, first focusing means intermediate said electron gun and said read-in deflection means, a magnetizable film disposed transversely adjacent the projecting end of said second leg portion, means associated with said second leg portion for premagnetizing said film in a direction normal to the plane of the film, second focusing means for said second leg intermediate the intersection of said leg portions and said film, detector means disposed at the projecting end of said third leg portion, third focusing means associated with said third leg portion, read-out deflection means intermediate said third focusing means and said detector means, means for applying a positive potential to said film during a read-in operation to cause the electron beam generated by said electron gun to impinge against said film, means for modulating the intensity of said electron beam during a read-in operation so that said beam will heat only certain portions of the film above the Curie point of said film in accordance with the information to be stored, means for applying a negative potential to said film during a read-out operation to cause the electron beam upon arrival in the neighborhood of said film to be reflected before impinging against said film, additional deflection means adjacent the intersection of said leg portions for separating the reflected information carrying beam from the incoming beam being directed toward said film during a read-out operation, and means for changing the energization of said second focusing means during a read-out operation to defocus the incoming beam and thereby spread said incoming beam over the general area of said film.

5. The electronic memory system set forth in claim 4 including means for preheating said film to a temperature somewhat below said Curie point.

6. The electronic memory system set forth in claim 4 including circuit means for producing an output signal dependent upon the degree of energization applied to said read-out deflection means and the production of a signal by said detector means.

7. A method of recording information on a relatively thin magnetizable medium comprising the steps of first magnetizing said medium in a direction normal to the general plane thereof, heating portions of said medium representative of the information to be stored to a temperature sufficient to cause said portions to lose their magnetization, and then permitting said portions to cool below said temperature so as to effect a reverse magnetization of said portions and thus retain said information on said medium.

8. A method of recording information on a magnetizable film comprising the steps of magnetizing said film to saturation in a direction normal to the general plane thereof, heating said film above its Curie point temperature in regions representative of the information to be stored, and then cooling said regions below said Curie point temperature to reverse the direction of magnetization in said regions to retain said information on said film.

9. The method set forth in claim 8 including the step of preheating said film to a temperature somewhat below its Curie point temperature.

10. A method of recording information on a magnetizable film comprising the steps of initially magnetizing said film to saturation in a direction normal to the general plane thereof, and impinging a beam of electrons against certain portions of the film with sufficient intensity to heat said portions above the Curie point of the film material, said portions being representative of information to be stored, and then cooling said portions below said Curie point to accomplish reversal of the magnetization of said portions.

11. A method of thermally storing and magnetically recording information in regions of reversed polarity in a magnetic film, comprising the steps of: pre-magnetizing the film normal to its general plane, applying a concentrated writing-in heat over localized areas of said pre-magnetized film, heating said film to a demagnetizing temperature at a point above the critical Curie point in said localized areas, cooling said heated areas to effect a reversal of magnetism in said localized areas to produce therewith a recorded image serving as an electron mirror, whereby on negative bias of said film during a read-out operation a reflected beam carries the recorded information.

12. The process of electronically reading out the recorded reverse magnetism of the film record product of claim 11, comprising the steps of placing the film record under a negative bias, defocusing a constant electron beam towards said record film, effecting an electron mirror of the said reverse recording on said film and obtaining an electron information image of the reflected beam as previously recorded on the said film record.

References Cited in the file of this patent

UNITED STATES PATENTS

| | | |
|---|---|---|
| 2,915,594 | Burns | Dec. 1, 1954 |
| 2,952,503 | Becker | Sept. 13, 1960 |

FOREIGN PATENTS

| | | |
|---|---|---|
| 770,127 | Great Britain | Mar. 13, 1957 |